(12) United States Patent
Kim et al.

(10) Patent No.: US 8,734,985 B2
(45) Date of Patent: May 27, 2014

(54) JELLY-ROLL TYPE BATTERY UNIT AND WINDING METHOD THEREOF AND LITHIUM SECONDARY BATTERY COMPRISING THE SAME

(75) Inventors: Chang-Seob Kim, Cheonan (KR); Ju-Hyung Kim, Cheonan (KR); Min-Ho Song, Cheonan (KR); Jun-Won Kang, Cheonan (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1627 days.

(21) Appl. No.: 11/304,710

(22) Filed: Dec. 16, 2005

(65) Prior Publication Data

US 2006/0147793 A1 Jul. 6, 2006

Related U.S. Application Data

(63) Continuation-in-part of application No. 10/748,197, filed on Dec. 31, 2003.

(30) Foreign Application Priority Data

Feb. 19, 2003 (KR) .................................. 2003-10410

(51) Int. Cl.
| | |
|---|---|
| *H01M 2/26* | (2006.01) |
| *H01M 2/30* | (2006.01) |
| *H01M 4/02* | (2006.01) |
| *H01M 4/70* | (2006.01) |
| *H01M 10/0587* | (2010.01) |
| *H01M 10/052* | (2010.01) |

(52) U.S. Cl.
CPC ................ *H01M 2/263* (2013.01); *H01M 4/70* (2013.01); *H01M 10/0587* (2013.01); *H01M 10/052* (2013.01)
USPC ............................... 429/211; 429/94; 429/233

(58) Field of Classification Search
CPC ........... H01M 2/26; H01M 4/64; H01M 4/70; H01M 10/058; H01M 10/052
USPC ............................ 429/94, 164, 209, 211, 233
See application file for complete search history.

(56) References Cited

U.S. PATENT DOCUMENTS

| | | | |
|---|---|---|---|
| 5,508,122 A | 4/1996 | Narukawa et al. | |
| 5,657,522 A | 8/1997 | Figueira et al. | |

(Continued)

FOREIGN PATENT DOCUMENTS

| | | |
|---|---|---|
| CN | 1221516 A | 6/1999 |
| CN | 1275817 A | 12/2000 |

(Continued)

OTHER PUBLICATIONS

Office Action issued on Aug. 4, 2006 in corresponding Chinese Patent No. 200410002915.2.

(Continued)

*Primary Examiner* — Edu E Enin-Okut
(74) *Attorney, Agent, or Firm* — Christie, Parker & Hale, LLP

(57) ABSTRACT

A jelly-roll type battery unit includes a first electrode plate having a first electrode current collector with a first electrode tab, and a first electrode active material layer on a surface of the first electrode current collector; a second electrode plate having a second electrode current collector with a second electrode tab, and a second electrode active material layer on a surface of the second electrode current collector; and a separator interposed between the first electrode plate and the second electrode plate. The electrode tab is incorporated into the electrode current collector in an area of either first or second electrode plate where the corresponding electrode active material layer is not coated. The electrode tab is cut widthwise with respect to the electrode current collector from a center area of the electrode current collector and folded, and an insulating tape is adhered to either surface of the electrode tab.

15 Claims, 11 Drawing Sheets

(56) References Cited

U.S. PATENT DOCUMENTS

| | | | |
|---|---|---|---|
| 5,834,133 A | * | 11/1998 | Narukawa et al. ............ 429/171 |
| 6,054,233 A | | 4/2000 | Vourlis |
| 6,432,578 B1 | | 8/2002 | Sugita et al. |
| 6,451,473 B1 | | 9/2002 | Saito et al. |
| 2003/0175587 A1 | * | 9/2003 | Okutani et al. ............... 429/211 |

FOREIGN PATENT DOCUMENTS

| | | | |
|---|---|---|---|
| JP | 11-265706 | | 9/1999 |
| JP | 2000-77091 | | 3/2000 |
| JP | 2000-200595 | | 7/2000 |
| JP | 2000188115 A | * | 7/2000 |
| JP | 2001-266927 | | 9/2001 |
| JP | 2002056837 A | * | 2/2002 |
| JP | 2003-31201 | | 1/2003 |
| JP | 2003031201 A | * | 1/2003 |

OTHER PUBLICATIONS

U.S. Appl. No. 10/748,197, filed Dec. 31, 2003, Chang-Seob Kim et al., Samsung SDI Co., Ltd.

U.S. Office action dated Oct. 13, 2010, for parent U.S. Appl. No. 10/748,197, noting listed reference in this IDS.

U.S. Office action dated Mar. 13, 2011 for parent U.S. Appl. No. 10/748,197.

SIPO Certificate of Patent dated Jul. 11, 2007, for corresponding Chinese Patent application 200410002915.2, noting listed references in this IDS, 24 pages.

* cited by examiner

US 8,734,985 B2

JELLY-ROLL TYPE BATTERY UNIT AND WINDING METHOD THEREOF AND LITHIUM SECONDARY BATTERY COMPRISING THE SAME

CROSS-REFERENCE TO RELATED APPLICATIONS

This application is a continuation in part of U.S. patent application Ser. No. 10/748,197, filed Dec. 31, 2003 and currently pending, which claims the benefit of Korean Patent Application No. 2003-10410, filed on Feb. 19, 2003 in the Korean Intellectual Property Office, the disclosures of which are incorporated hereinto by reference.

BACKGROUND OF THE INVENTION

1. Field of the Invention

The present invention relates to a lithium secondary battery, and more particularly, to a jelly-roll type battery unit configured such that an electrode tab is incorporated into an electrode current collector and having an improved structure in which electrode plates are disposed, a winding method of the battery unit and a lithium secondary battery employing the battery.

2. Description of the Related Art

Unlike a primary battery incapable of charging, secondary batteries are generally capable of charging and discharging. Lithium batteries are in a widespread use in advanced electronic devices such as cellular phones, notebook-type computers, camcorders and the like, and are classified into nickel-cadmium (Ni—Cd) batteries, nickel-hydride (Ni-MH) batteries and lithium secondary batteries. Specifically, the lithium secondary batteries are rapidly developing in view of their high operating voltage of 3.6 V or higher, which is approximately 3 times that of the nickel-cadmium (Ni—Cd) batteries or nickel-hydride (Ni-MH) batteries, and their excellent energy density per unit weight. In recent years, lithium secondary batteries have attracted attention since they have a high energy density per unit weight and an operating voltage of 3.6 V or greater, which is three times higher than nickel-cadmium (Ni—Cd) batteries, nickel-metal hydride (Ni-MH) batteries and nickel-hydrogen batteries.

Lithium secondary batteries use lithium oxide as a positive electrode active material and a carbon material as a negative electrode active material. The lithium secondary batteries may be classified into liquid electrolyte batteries and solid electrolyte batteries according to the electrolyte used. In general, batteries using a liquid electrolyte are referred to as lithium-ion batteries and batteries using a polymeric electrolyte are referred to as lithium polymer batteries. The lithium secondary batteries may be manufactured in various shapes, typically in cylindrical, rectangular or pouch shapes.

FIG. 1 shows a winding start portion of a battery 10 disclosed in U.S. Pat. No. 5,508,122 and FIG. 2 shows a winding completion portion of the battery 10 shown in FIG. 1. Referring to the FIG. 1, the battery 10 includes a positive electrode plate 1, a negative electrode plate 2 and a separator 3. The positive electrode plate 1 includes a positive electrode current collector 11 and positive electrode slurry coated on both surfaces of the positive electrode current collector 11. A positive electrode tab 12 is attached to a portion of the positive electrode plate 1 where the positive electrode slurry is not coated. The positive electrode current collector 11 and the positive electrode tab 12 are both made of aluminum.

The negative electrode plate 2 includes a negative electrode current collector 21 and negative electrode slurry coated on both surfaces of the negative electrode current collector 21. A negative electrode tab 22 is attached to a portion of the negative electrode plate 2 where the negative electrode slurry is not coated. The negative electrode current collector 21 is made of a copper foil and the negative electrode tab 22 is made of nickel.

In the battery 10 having the above-described configuration, the separator 3, the positive electrode plate 1 and the negative electrode plate 2 are wound around a winding spool 4 in that order. The negative electrode plate 2 is wound onto the electrode unit that is greater than or equal to 15 mm after the beginning of the positive electrode plate 1. Thus, the surface of the positive electrode tab 12 faces the positive electrode current collector 11 with the separator 3 disposed therebetween.

As to the winding completion portion of the battery 10, the surface of the negative electrode tab 22 faces the separator 3, an insulating tape 5 is attached to the end portion of the positive electrode slurry coated portion and winding of the negative electrode tab 22 is then performed. Thus, a vortex of electrodes may be prevented, and the positive electrode plate 1 may not be positioned at a portion facing the negative electrode tab 22.

However, the conventional battery 10 has the following problems. The negative electrode tab 22 made of a nickel plate is attached to an area of the negative electrode plate 2 made of a copper foil where a negative electrode slurry is not coated by ultrasonic welding. Here, since the negative electrode plate 2 has the negative electrode tab 22 made of a different metal from the same, it is prone to deformation during charge and discharge.

In particular, in the case of using a strip-shaped electrode plate, adhesiveness between each electrode plate and a separator may be lowered due to foreign matter during winding, producing a non-charged area and deforming a jelly-roll type battery unit, thus affecting the thickness of the battery 10. Since the negative electrode tab 22, which is separately provided, is welded on the negative electrode plate 2, the material cost increases due to consumption of the negative electrode tab 22. Also, use of different metals increases internal resistance.

SUMMARY OF THE INVENTION

An aspect of the present invention provides a jelly-roll type battery unit having the improved structure to prevent the battery unit from being deformed by using a partly cut portion of a current collector as an electrode tab, a winding method of the battery unit, and a lithium secondary battery comprising the battery unit.

An aspect of the present invention also provides a jelly-roll type battery unit having the improved efficiency, the battery unit being wound in a state in which an electrode tab partially overlaps a current collector of the opposite polarity, a winding method of the battery unit, and a lithium secondary battery comprising the battery unit.

To accomplish the above and/or other aspects, according to an embodiment of the present invention, a jelly-roll type battery unit comprises a first electrode plate having a first electrode current collector with a first electrode tab, and a first electrode active material layer coated on at least one surface of the first electrode current collector, a second electrode plate having a second electrode current collector with a second electrode tab, and a second electrode active material layer coated on at least one surface of the second electrode current collector; and a separator that is interposed between the first electrode plate and the second electrode plate, wherein the electrode tab is a folded portion of the electrode current collector using material cut from an area of either first or second electrode plate where the corresponding electrode active material layer is not coated, the electrode tab is cut widthwise with respect to the electrode current collector from a center area of the electrode current collector and folded, and an insulating tape is adhered to either surface of the electrode tab.

According to an aspect of the present intention, the electrode tab is exposed toward the upper end of the electrode current collector.

According to an aspect of the present intention, the insulating tape is interposed between the inner and outer surfaces of the electrode tab that is folded upward.

According to an aspect of the present intention, the electrode tab is formed by cutting a portion of a winding start portion of the electrode current collector and folding upward.

According to an aspect of the present intention, the electrode tab is formed by cutting a portion of a winding completion portion of the electrode current collector and folding upward.

According to an aspect of the present intention, the folded electrode tab partially overlaps with the electrode tab having the opposite polarity.

According to another aspect of the invention, lithium secondary battery comprises a battery unit having a first electrode plate having a first electrode tab, a separator and a second electrode plate of the opposite polarity to the first electrode plate, the second electrode plate having a second electrode tab, sequentially disposed, a can having a space in which the battery unit is housed, and a cap assembly connected to an upper portion of the can, and having a cap plate and an electrode terminal connected to the cap plate through a terminal through hole formed in the cap plate and having a gasket at its outer surface for insulation from the cap plate, wherein the first electrode plate includes a first electrode current collector connected to the first electrode tab and a first electrode active material layer coated on at least one surface of the first electrode current collector, the second electrode plate includes a second electrode current collector connected to the second electrode tab and a second electrode active material layer coated on at least one surface of the second electrode current collector, the electrode tab connected to at least one of the first and second electrode plates is cut from a center area of the electrode current collector and folded upward, and an insulating tape is adhered to either surface of the electrode tab.

According to an aspect of the present intention, an end of the electrode tab is exposed toward the upper end of the electrode current collector.

According to an aspect of the present intention, the insulating tape is interposed between the inner and outer surfaces of the electrode tab that is folded upward.

According to an aspect of the present intention, the electrode tab is formed by cutting a portion of a winding start portion of the electrode current collector and folding upward.

According to an aspect of the present intention, the electrode tab is formed by cutting a portion of a winding completion portion of the electrode current collector and folding upward.

According to an aspect of the present intention, the folded electrode tab partially overlaps with the electrode tab having the opposite polarity.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
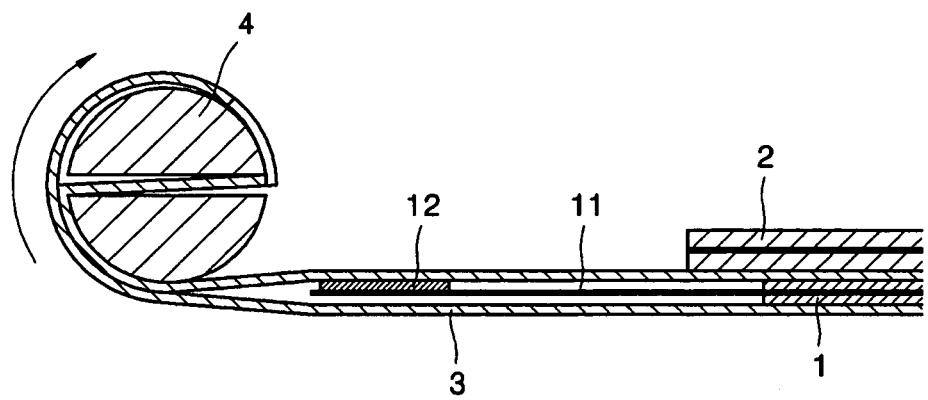
FIG. 1 is a cross-sectional view showing a winding start portion of a conventional battery.
Figure 2:
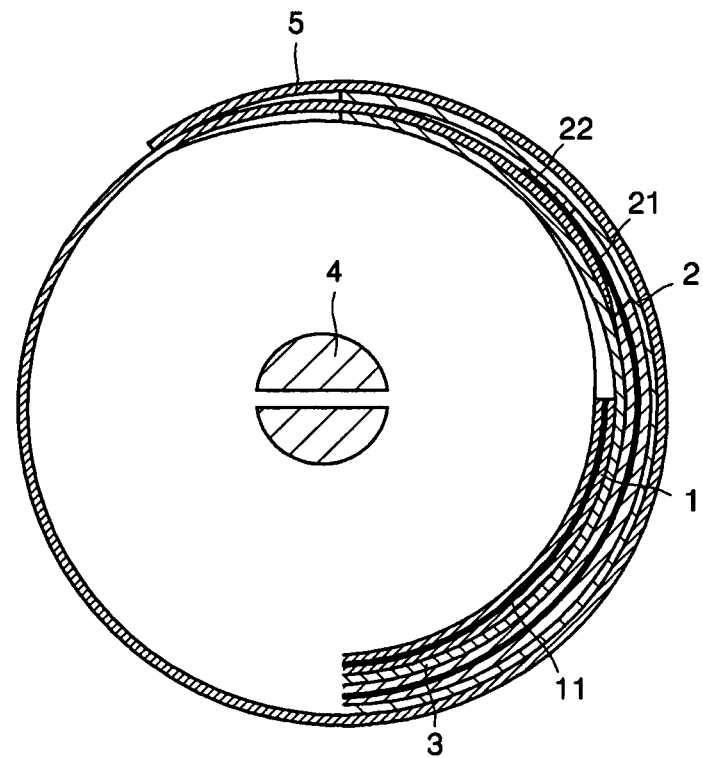
FIG. 2 is a cross-sectional view showing a winding completion portion of the conventional battery shown in FIG. 1.

Reference will now be made in detail to the embodiments of the present invention, examples of which are illustrated in the accompanying drawings, wherein like reference numerals refer to the like elements throughout. The embodiments are described below to explain the present invention by referring to the figures.

A jelly-roll type lithium secondary battery according to an aspect of the present invention will now be described in detail with reference to the accompanying drawings. FIGS. 3-5 and 12 show a rectangular lithium secondary battery 30 according to an embodiment of the present invention. Referring to FIGS. 3-5 and 12, the lithium secondary battery 30 includes a can 31, a battery unit 32 housed inside the can 31 and a cap assembly 300 connected to an upper portion of the can 31. The can 31 is made of a rectangular metal having a cavity. The can 31 itself serves as an electrode terminal and is electrically connected, such as through welding, to one of the electrode tabs (such as a positive electrode tab 43 connected to a positive electrode plate 35). The can 31 is generally made of aluminum.

A safety vent 33 is formed on the bottom surface 31a of the can 31. Since the safety vent 33 is thinner than other portions of the can 31, when internal pressure of the can 31 increases due to overcharge, the thinner portion is broken faster than the other portions of the can 31, thus improving safety of the battery. To prevent a charge-discharge probe from being damaged when the probe contacts the bottom surface 31a during a formation process, a protective plate 34 generally made of nickel is fixedly welded to a lower portion of the safety vent 33.

Figure 4:
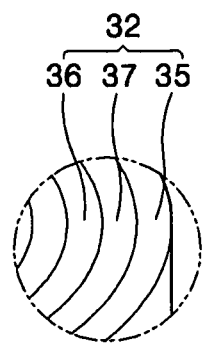
FIG. 4 is a partly enlarged view of a battery unit shown in FIG. 3.

As shown in FIG. 4, the battery unit 32 housed inside the can 31 includes a positive electrode plate 35, a negative electrode plate 36 and a separator 37. The positive and negative electrode plates 35 and 36 and the separator 37 are formed of a sheet of strip, respectively. The battery unit 32 has the positive electrode plate 35, the separator 37, the negative electrode plate 36 and the separator 37 sequentially disposed and wound.

The cap plate 310 is provided at the cap assembly 300 connected to an upper portion of the can 31. The cap plate 310 is a metal plate having the size and shape corresponding to an opening of the can 31. A terminal through hole 311 having a predetermined size is formed at the center of the cap plate 310. An electrode terminal, e.g., a negative electrode terminal 330, is positioned at the terminal through hole 311 so as to be inserted into the terminal through hole 311. A tube-shaped gasket 320 is installed at the outer surface of the negative electrode terminal 330 for insulation from the cap plate 310. An insulating plate 340 is installed on the bottom surface of the cap plate 310. A terminal plate 350 is installed on the bottom surface of the insulating plate 340. The lower end of the negative electrode terminal 330 is electrically connected to the terminal plate 350.

An electrolytic solution inlet 312 is formed at one side of the cap plate 310 so as to allow a liquid electrolyte to be inserted. The electrolytic solution inlet 312 has a bolt 370 sealably connected thereto. However, if a solid or polymer electrolyte is used, it is understood that the inlet 312 and bolt 370 can be omitted.

An insulation case 360 is installed between the battery unit 31 and the cap assembly 300 for electrical insulation therebetween. The insulation case 360 is made of a polymer resin having an insulating property, generally polypropylene. As shown by the dashed lines extending through the case 360, the plates 340 and 350, the through hole 311, and the gasket 320, as well as in FIG. 12, another electrode tab (such as a negative electrode tab 430 connected to a negative electrode plate 36) is connected to the negative electrode terminal 330 such as by welding.

Figure 3:
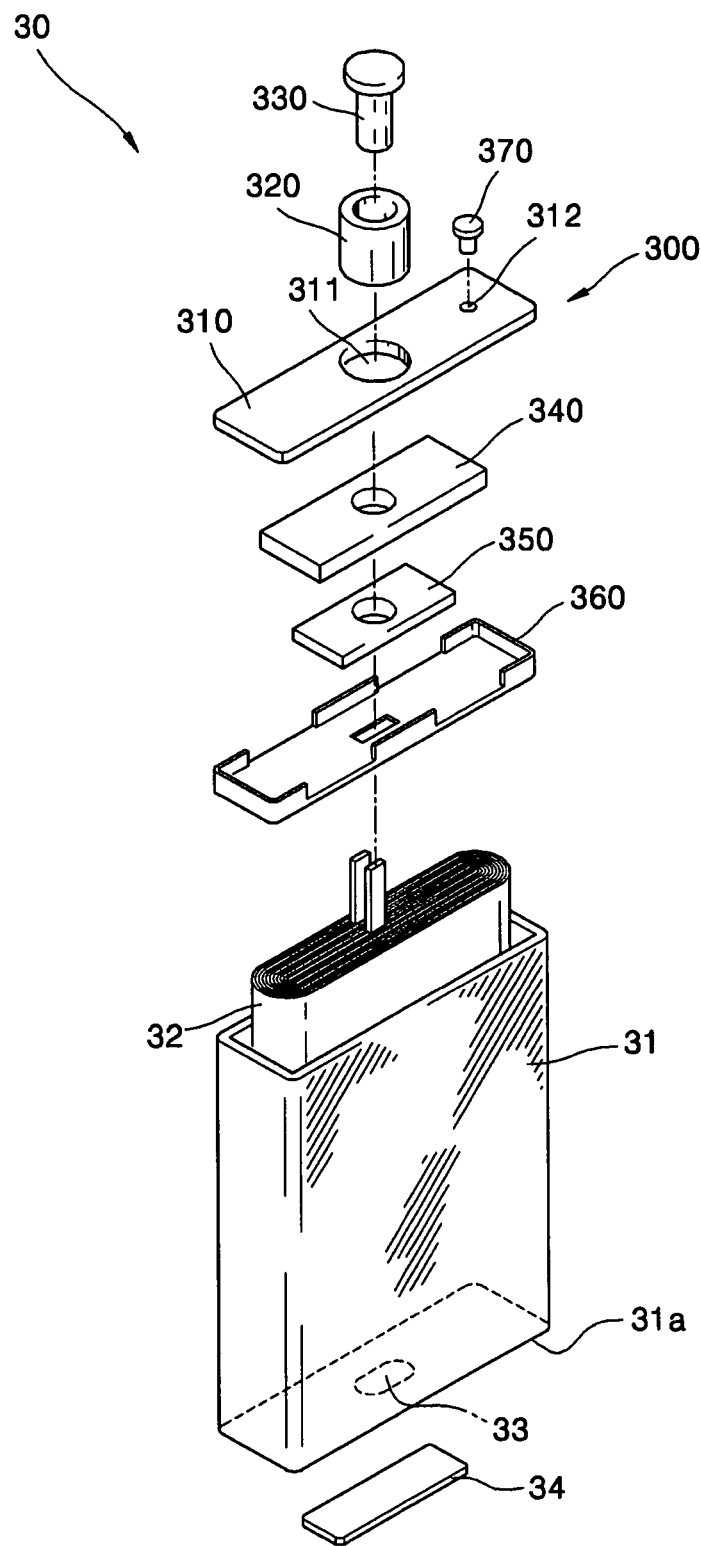
FIG. 3 is an extracted perspective view of a lithium secondary battery according to an embodiment of the present invention.
Figure 5:
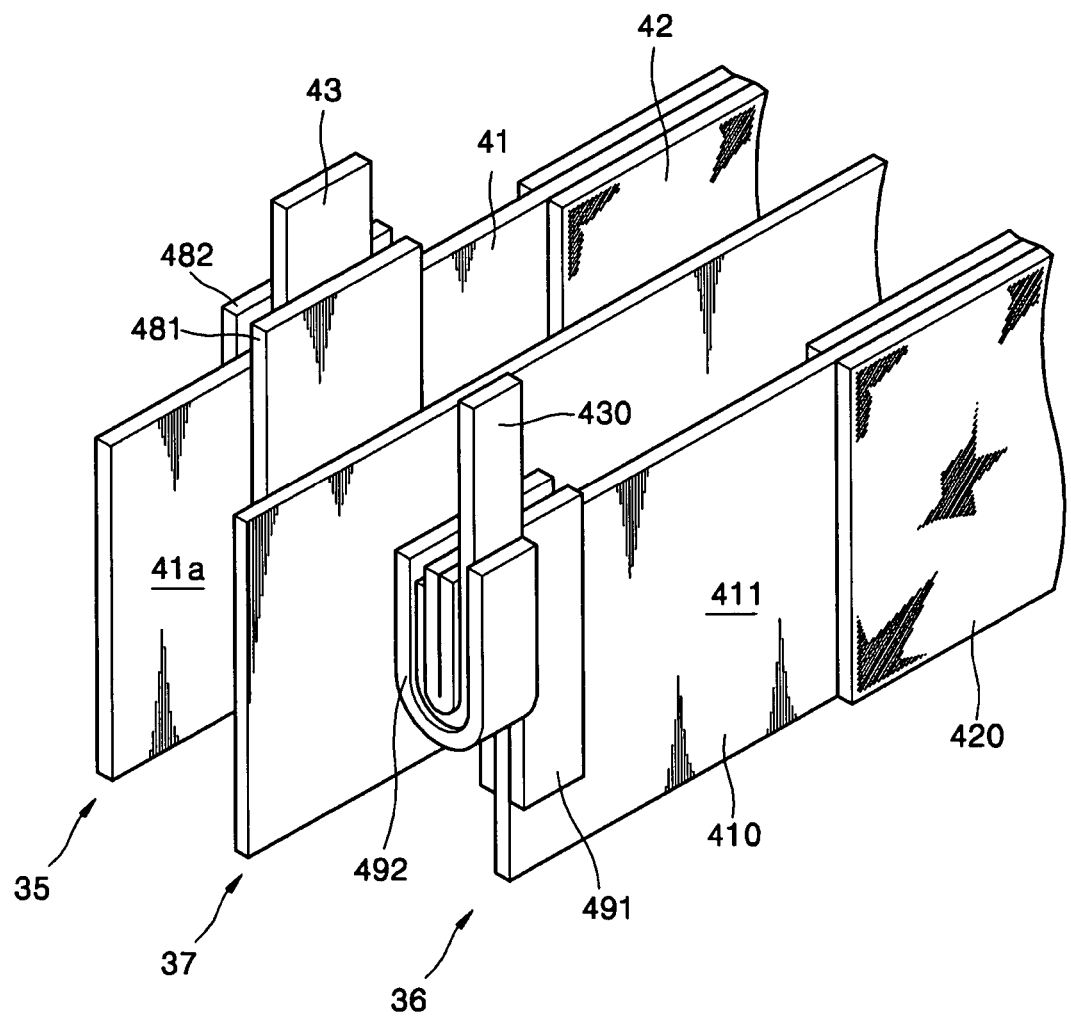
FIG. 5 is a partly extracted perspective view of a portion where an electrode tab of the battery unit shown in FIG. 3 is formed.

One feature of the present invention is that an electrode tab electrically connected to an electrode plate of the battery unit 31 is formed by cutting a portion of the electrode plate to then be incorporated thereinto, which will now be described in more detail in relation to FIG. 5. FIG. 5 shows the battery unit 32 shown in FIG. 3. Referring to FIG. 3, the battery unit 32 includes a strip-shaped positive electrode plate 35, a negative electrode plate 36, and a separator 37 interposed between the positive and negative electrode plates 35 and 36. The positive electrode plate 35 includes a positive electrode current collector 41 made of an aluminum foil, and a positive electrode active material layer 42 having a lithium-based oxide coated on both surfaces of the positive electrode current collector 41.

The positive electrode current collector 41 includes a positive electrode uncoated area 41a where the positive electrode active material layer 42 is not formed. A positive electrode tab 43 is welded to the positive electrode uncoated area 41a. An end of the positive electrode tab 43 protrudes toward the upper end of the positive electrode current collector 41.

To insulate the positive electrode 35 from the negative electrode 36 or to prevent the separator 37 from being torn by the positive electrode tab 43, a plurality of positive electrode insulating tapes 481 and 482 are attached to the outer surface of the positive electrode uncoated area 41a of the positive electrode tab 43. The positive electrode insulating tapes 481 and 482 generally cover a boundary between the upper end of the positive electrode current collector 41 and the positive electrode tab 43.

The negative electrode plate 36 includes a negative electrode current collector 410 made of a copper foil, and a negative electrode active material layer 420 having carbon material coated on both surfaces of the negative electrode current collector 410. The negative electrode current collector 410 includes a negative electrode uncoated area 411 where the negative electrode active material layer 420 is not formed. A negative electrode tab 430 is welded to the negative electrode uncoated area 411. An end of the negative electrode tab 430 protrudes toward the upper end of the negative electrode current collector 410.

As in the positive electrode plate 35, a plurality of negative electrode insulating tapes 491 and 492 are attached to the outer surface of the negative electrode uncoated area 411 of the negative electrode tab 430. The negative electrode insulating tapes 491 and 492 generally cover an interface between the upper end of the negative electrode current collector 410 and the negative electrode tab 430.

Unlike in the positive electrode plate 35, the negative electrode tab 430 is formed by cutting a portion of the negative electrode current collector 410. In other words, the negative electrode tab 430 may be formed by cutting a winding portion of the negative electrode uncoated area 411 by at least half the width of the electrode tab and folding the cut winding portion to the upper end of the negative electrode current collector 410 that is not cut. A portion of the folded portion of the negative electrode uncoated area 411 is exposed for a predetermined length to the upper portion of the negative electrode current collector 410 so that it is electrically connected to a negative electrode terminal.

When the negative electrode uncoated area 411 is folded, the negative electrode insulating tapes 491 and 492 surrounding the outer surface of the negative electrode current collector 410 are also folded, which is advantageous in view of manufacturing process, thereby preventing a short-circuit between the positive electrode 36 and the negative electrode plate 36 or preventing the separator 37 from being torn.

Alternatively, the cut negative electrode uncoated area 411 may be folded to the upper portion of the negative electrode current collector 410, followed by attaching of the first and second negative electrode insulating tapes 491 and 492.

Accordingly, the negative electrode tab 430 is incorporated into the negative electrode current collector 410. As described above, the negative electrode tab 430 is constructed such that the negative electrode uncoated area 411 that is wound for the first time in winding process is cut and folded upward to then be connected to the negative electrode terminal.

The separator 37 is disposed between the positive electrode plate 35 and the negative electrode plate 36 for insulation. The separator 37 is generally made of polyethylene, polypropylene or a composite film of polyethylene and polypropylene. To prevent a short-circuit between the electrode plates 35 and 36, the separator 37 is advantageously wider than the positive or negative electrode plate 35 or 36.

Figure 6A:
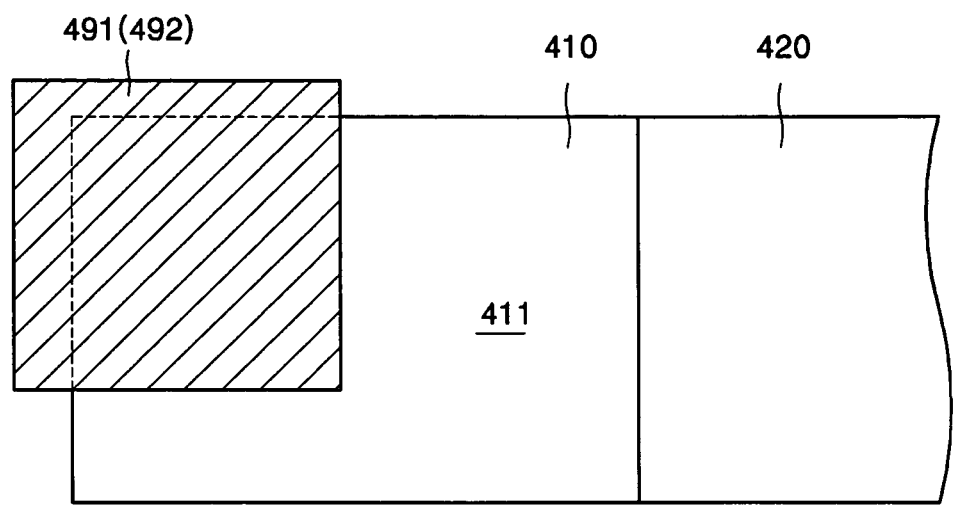
FIGS. 6A through 6C show sequential steps of forming the electrode tab shown in FIG. 3, in which FIG. 6A schematically shows a state in which an insulating tape is adhered to an electrode current collector, FIG. 6B schematically shows a state in which the electrode current collector shown in FIG. 6A is partly extracted, and FIG. 6C schematically shows a state in which an electrode tab is formed at the electrode current collector shown in FIG. 6B.
Figure 6B:
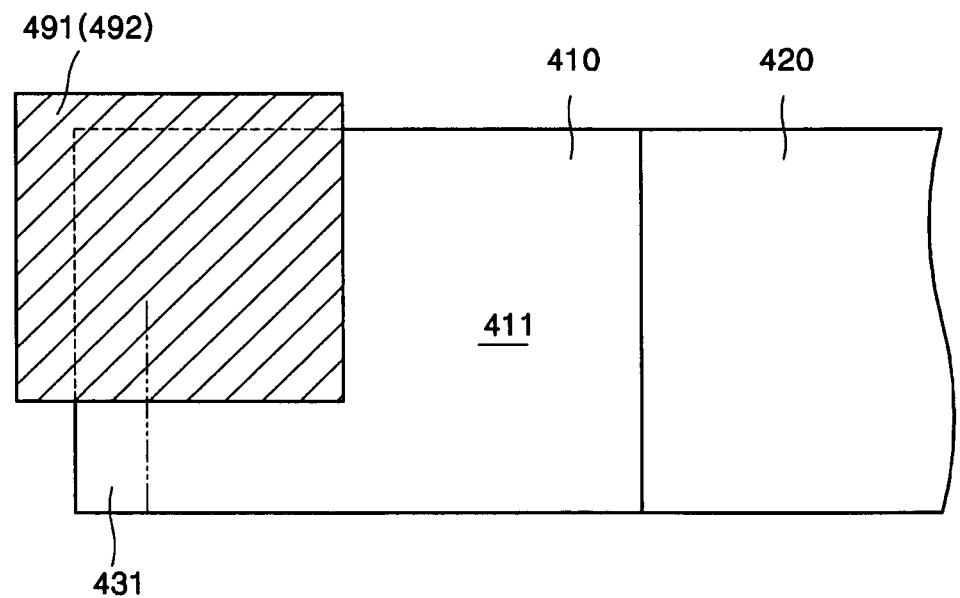
Figure 6C:
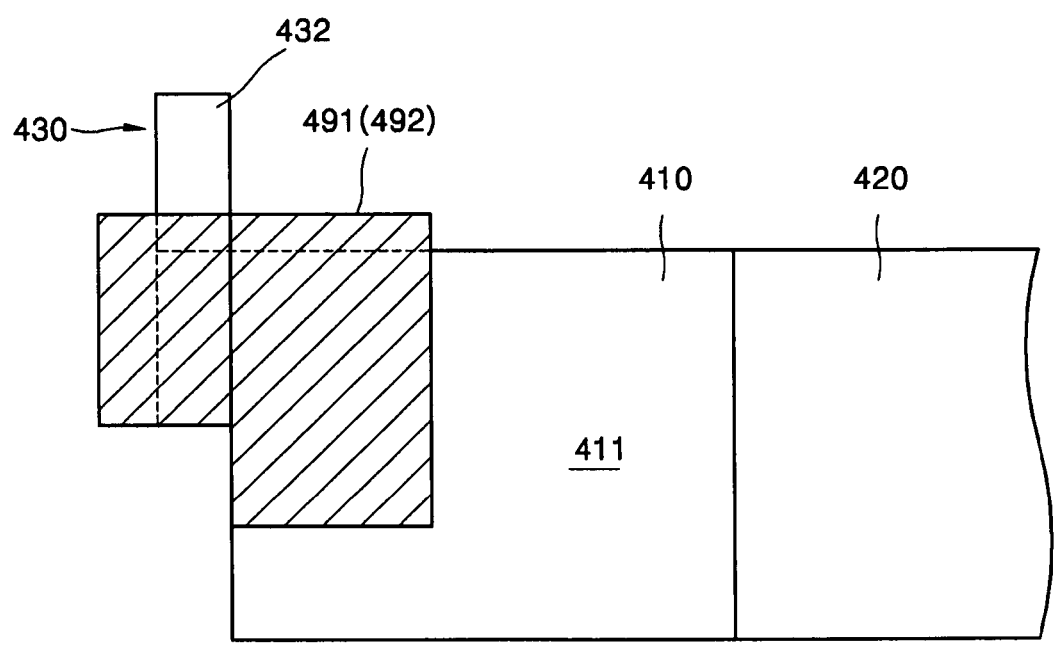

The electrode plate having an electrode tab incorporated thereinto is manufactured according to an embodiment of the invention as follows. FIG. 6A schematically shows a state in which the insulating tapes 491 and 492 are adhered to the negative electrode current collector 410 shown in FIG. 5. FIG. 6B schematically shows a state in which the electrode current collector 410 shown in FIG. 6A is partly extracted, and FIG. 6C schematically shows a state in which the negative electrode tab 430 is formed at the negative electrode current collector 410 shown in FIG. 6B.

Referring to FIG. 6A, the negative electrode current collector 410 is formed in a strip shape and the negative electrode active material layer 420 is formed on the surface of the negative electrode current collector 410. The negative electrode uncoated area 411 where the negative electrode active material layer 420 is not coated is formed on the negative electrode current collector 410. The negative electrode uncoated area 411 corresponds to a winding start portion in winding.

The negative electrode insulating tapes 491 and 492 having a predetermined width are adhered to a leading edge of the negative electrode uncoated area 411. The negative electrode insulating tapes 491 and 492 are advantageously adhered to the front and rear surfaces of the negative electrode current collector 410 for insulation from the other electrode. The upper ends of the negative electrode insulating tapes 491 and 492 cover the upper portion of the negative electrode uncoated area 411. The negative electrode insulating tapes 491 and 492 may also be adhered after the negative electrode tab 430 is formed.

As shown in FIG. 6B, the leading edge of the negative electrode uncoated area 411 having the negative electrode insulating tapes 491 and 492 is cut at a predetermined width as indicated by a dotted line. A cut portion 431 of the negative electrode uncoated area 411 has a size corresponding to the width of the negative electrode tab 430 to be formed in a subsequent process. The cut portion 431 is cut at least in half widthwise with respect to the negative electrode current collector 410 from the lower end of the negative electrode uncoated area 411. This is to expose the end of the cut portion 431 to the upper end of the negative electrode uncoated area 411 when the cut portion 431 is folded upward.

As shown in FIG. 6C, the cut portion 431 is folded toward the upper end of the negative electrode current collector 410, forming the negative electrode tab 430. One end 432 of the negative electrode tab 430 is exposed outside the upper end of the negative electrode current collector 410 to then be connected to the negative electrode terminal when the battery is assembled.

As is described above, the negative electrode tab 430 forms the negative electrode terminal by cutting a portion of the negative electrode uncoated area 411 and folding the same. Thus, the negative electrode tab 430 is integrally formed with the negative electrode current collector 410. In other words, a separate electrode tab does not need to be welded to the negative electrode current collector 410.

The negative electrode insulating tapes 491 and 492 coated on both surfaces of the negative electrode uncoated area 411 having the negative electrode tab 430 are also folded upward when folding the negative electrode tab 430. Accordingly, the negative electrode insulating tape 491 is disposed on the inner surface of the negative electrode tab 430, and the negative electrode insulating tape 492 is disposed on the outer surface of the negative electrode tab 430.

Figure 7:
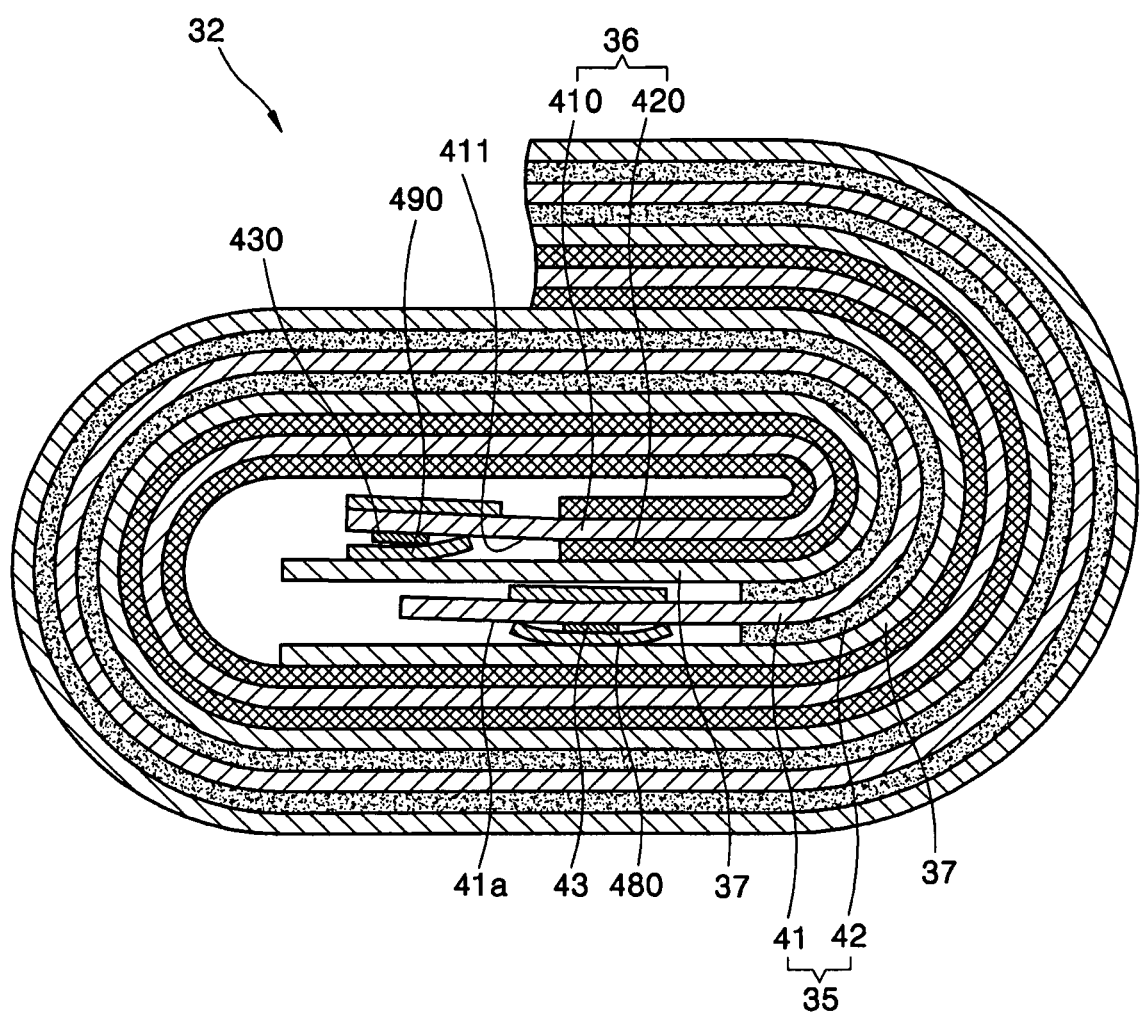
FIG. 7 is a cross-sectional view showing a winding start portion of the battery shown in FIG. 3.

The battery unit having the electrode plate having an electrode tab incorporated thereinto is wound according to an embodiment of the invention as follows. FIG. 7 shows a winding start portion of the battery unit 32, in which the same reference numerals as those described above denote the same functional elements. Referring to FIG. 7, the battery unit 32 includes a negative electrode plate 36, a separator 37, a negative electrode plate 35 and a separator 37 sequentially disposed from the innermost part thereof, and the resultant structure is wound in one direction in such a disposed state.

In the winding start portion of the negative electrode plate 36, the negative electrode tab 430 is integrally formed with the negative electrode current collector 410 on the negative electrode uncoated area 411. The negative electrode tab 430 is formed by cutting a portion of the negative electrode uncoated area 411 and folding the same. A negative electrode insulating tape 490 is attached to either surface of the negative electrode uncoated area 411 having the negative electrode tab 430.

At a portion where the negative electrode tab 430 is formed, the negative electrode uncoated area 411 is folded and the negative electrode insulating tape 490 is interposed between the inner and outer surfaces of the portion where the negative electrode tab 430 is formed. Accordingly, the portion where the negative electrode tab 430 is formed has a multi-layered structure. A negative electrode active material layer 420 is coated on the negative electrode current collector 410 spaced apart from the portion where the negative electrode tab 430 is formed.

The separator 37 is disposed on the outer surface of the negative electrode plate 36.

A positive electrode current collector 41 having a positive electrode active material layer 42 coated on its both surfaces is disposed on the outer surface of the separator 37. A separate positive electrode tab 43 is welded to a positive electrode uncoated area 41a of the positive electrode current collector 41. A positive electrode insulating tape 480 is attached to the outer surface of the positive electrode current collector 41 having the positive electrode tab 43.

Another separator 37 is disposed on the outer surface of the positive electrode plate 35.

The battery unit 32 having the above-described configuration is wound in one direction and has a size that allows the battery unit to fit inside a rectangular can (such as can 31 shown in FIG. 3). The negative electrode tab 430 is wound such that the positive electrode current collector 41 partially overlaps at the center of the battery unit 31. Since two opposite electrode tabs 43 and 430 are disposed at the center of the battery unit 31 in such a manner, current collection is more effectively achieved.

Figure 8:
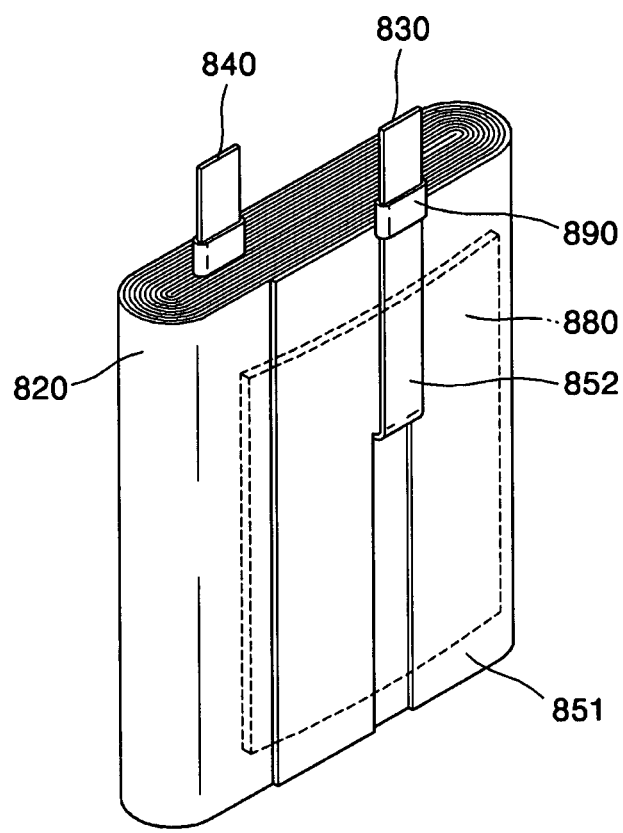
FIG. 8 is a perspective view showing a battery unit according to another embodiment of the present invention.
Figure 9:
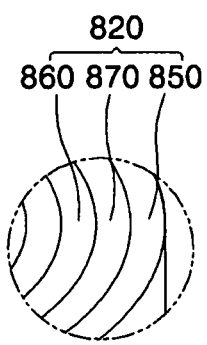
FIG. 9 is an enlarged perspective view of the battery unit of FIG. 8.

FIG. 8 shows a battery unit 820 according to another embodiment of the present invention. Referring to FIG. 8, the battery unit 820 is configured such that a positive electrode plate 850 and a negative electrode plate 860 are disposed with a separator 870 interposed therebetween and wound in a jelly-roll configuration. As described above, the positive electrode plate 850 includes a positive electrode current collector and a positive electrode active material layer coated on at least one plane of the positive electrode current collector, and the negative electrode plate 860 includes a negative electrode current collector and a negative electrode active material layer coated on at least one plane of the negative electrode current collector. Also, the positive electrode tab 830 and the negative electrode tab 840 are electrically connected to an uncoated area of either the positive or negative electrode current collector. A sealing tape 890 is wrapped around edge portions of the positive or negative electrode tabs 830 and 840.

The positive electrode tab 830 is formed by cutting a portion 852 of the positive electrode current collector. In other words, the positive electrode tab 830 may be formed by cutting a portion of a winding completion portion 851 of the positive electrode plate 850 by a width of the electrode tab and folding toward an upper end of the positive electrode plate 850 that is not cut.

To make the battery unit 820 maintain its shape after being wound in a jelly-roll configuration, which is quite difficult due to its elasticity, an insulative finishing tape 880 is installed on the outer surface of the outermost positive electrode plate 850. The finishing 880 has an insulating property similar to the insulating property of the electrode insulating tape and maintains the shape of the battery unit 820.

Figure 10A:
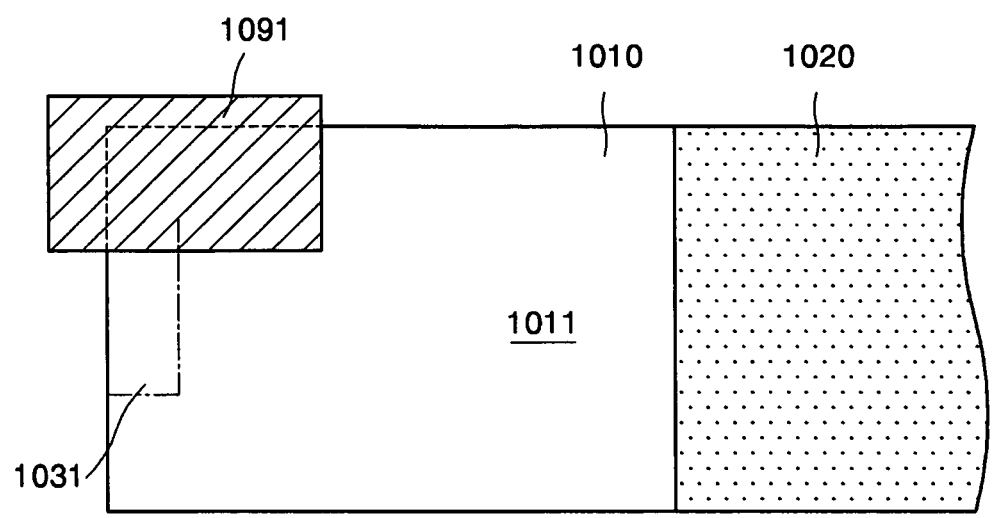
FIG. 10A schematically shows a state in which a portion of an electrode current collector is cut according to an embodiment of the present invention.
Figure 10B:
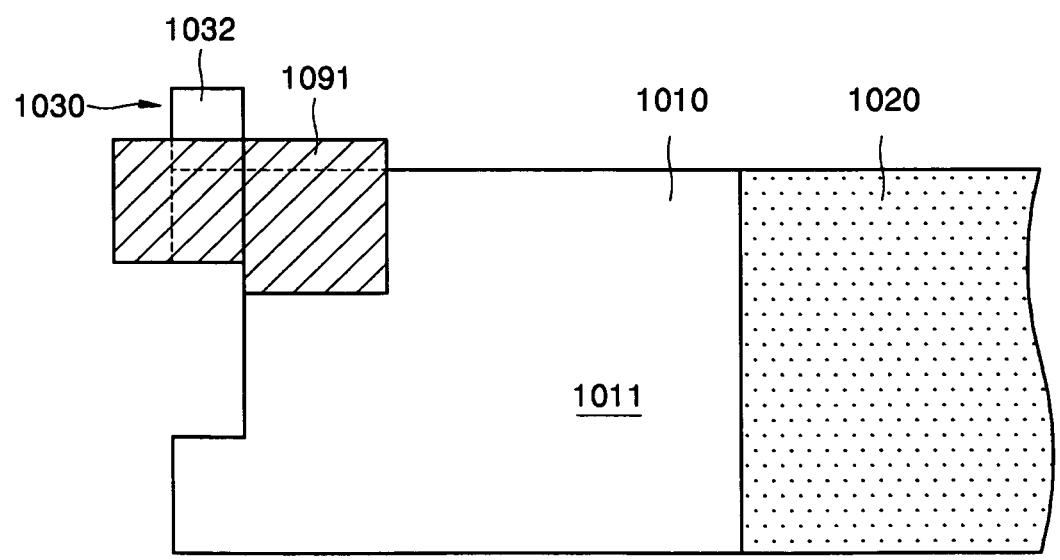
FIG. 10B schematically shows a state in which an electrode tab is formed in the electrode current collector shown in FIG. 10A.

FIG. 10A schematically shows a state in which a portion of an electrode current collector 1010 is cut according to an embodiment of the present invention. FIG. 10B schematically shows a state in which an electrode tab 1032 is formed in the electrode current collector 1010 shown in FIG. 10A. Referring to FIG. 10A, the electrode current collector 1010 is formed in a strip shape and an electrode active material layer 1020 is formed on the surface of the electrode current collector 1010. An electrode uncoated area 1011 where the electrode active material layer 1020 is not coated is formed on the electrode current collector 1010. The electrode uncoated area 1011 corresponds to a winding start portion or a winding completion portion of the electrode current collector 1010 in winding.

A plurality of electrode insulating tapes 1091 are adhered to a lengthwise end of the electrode uncoated area 1011. The electrode insulating tapes 1091 are advantageously adhered to the front and rear surfaces of the electrode current collector 1010 for insulation from the other electrode. The electrode insulating tapes 1091 cover the lengthwise upper portion of the electrode uncoated area 1011. The electrode insulating tapes 1091 may also be adhered after the electrode tab 1032 is formed.

The electrode tab 1030 is incorporated into the electrode current collector 1010 in the electrode uncoated area 1011 and cut widthwise with respect to the electrode current collector 1010 from a center area of the electrode current collector 1010 and folded. In other words, a portion of the electrode uncoated area 1011 having the electrode insulating tapes 1091 is cut at a predetermined width as indicated by a dotted line. A cut portion 1031 of the electrode uncoated area 1011 has a size corresponding to the width of an electrode tab 1030 to be formed in a subsequent process. The cut portion 1031 is cut widthwise with respect to the electrode current collector 1010 from the center of the electrode uncoated area 1011 to near the upper end of the electrode current collector 1010. The cut portion 1031 is folded toward the upper end of the electrode current collector 1010, forming the electrode tab 1030. One end 1032 of the electrode tab 1030 is exposed outside the upper end of the electrode current collector 1010 to then be electrically connected to the electrode terminal when the battery is assembled.

The electrode insulating tapes 1091 are interposed between the inner and outer surfaces of the electrode tab 1030. The electrode insulating tapes 1091 are folded up when the electrode tab 1030 is folded. In addition, the folded electrode tab 1030 partially overlaps with an electrode tab having the opposite polarity.

As is described above, the negative electrode tab 430 forms the negative electrode terminal by cutting a portion of the negative electrode uncoated area 411 and folding the same. Thus, the negative electrode tab 430 is integrally formed with the negative electrode current collector 410. In other words, a separate electrode tab does not need to be welded to the negative electrode current collector 410.

The negative electrode insulating tapes 491 and 492 coated on both surfaces of the negative electrode uncoated area 411 having the negative electrode tab 430 are also folded upward when folding the negative electrode tab 430.

Accordingly, the negative electrode insulating tape 491 is disposed on the inner surface of the negative electrode tab 430, and the negative electrode insulating tape 492 is disposed on the outer surface of the negative electrode tab 430.

Figure 11A:
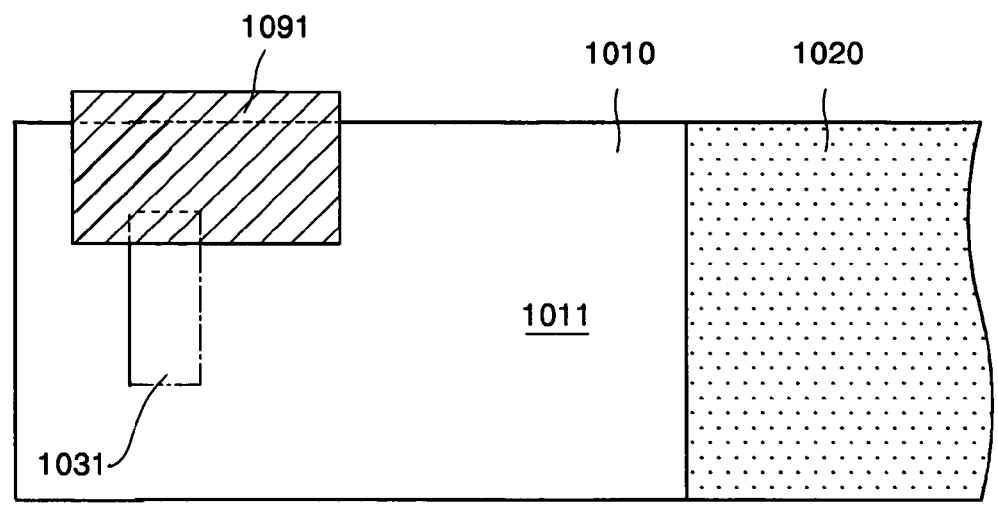
FIG. 11A schematically shows a state in which a portion of an electrode current collector is cut according to an embodiment of the present invention.
Figure 11B:
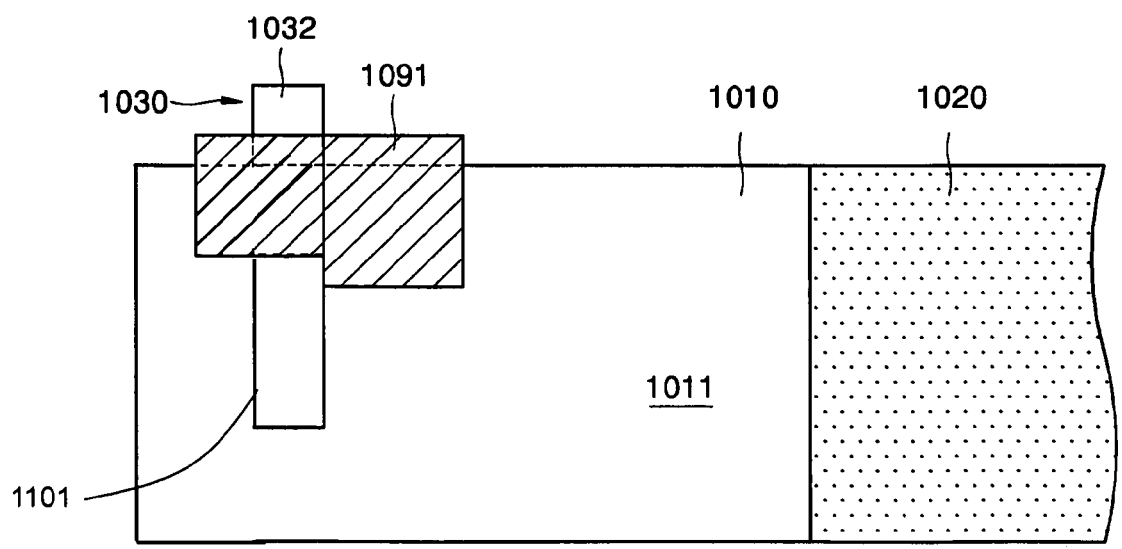
FIG. 11B schematically shows a state in which an electrode tab is formed in the electrode current collector shown in FIG. 11A.

According to an aspect of the invention shown in FIGS. 11A and 11B in which a cut portion of the electrode is disposed away from an edge of the current collector 1010. As such, when the tab 1030 is folded, a through hole 1101 is formed in the uncoated area 1011 of the current collector 1010. The remaining elements are similar to those set forth in above in relation to FIGS. 10A and 10B, and are not again presented.

Further, while the embodiments shown in FIGS. 10A through 11B describe an insulative tape 1091, it is understood that any supporting material can be used. Such supporting material can include insulative materials. However, the supporting material need not include such insulative materials in all aspects of the invention and can also be a combination of materials with and without insulative materials. Moreover, while the tab 1030 is shown as being folded so as to be incorporated into the collector 1010, it is understood that the tab 1030 or the uncoated area 1011 can be shaped so as to have an extension which extends around the supporting material 1091 to connect the uncoated area 1011 of the current collector 1010 and the tab 1030 so as to be attached (such as by welding). Further, while the through hole 1101 shown in FIG. 11B and the channel shaped cut shown in FIG. 10B extend through the current collector 1010, it is understood that the opening need not extend entirely through the thickness of the current collector in all aspects of the invention.

Figure 11C:
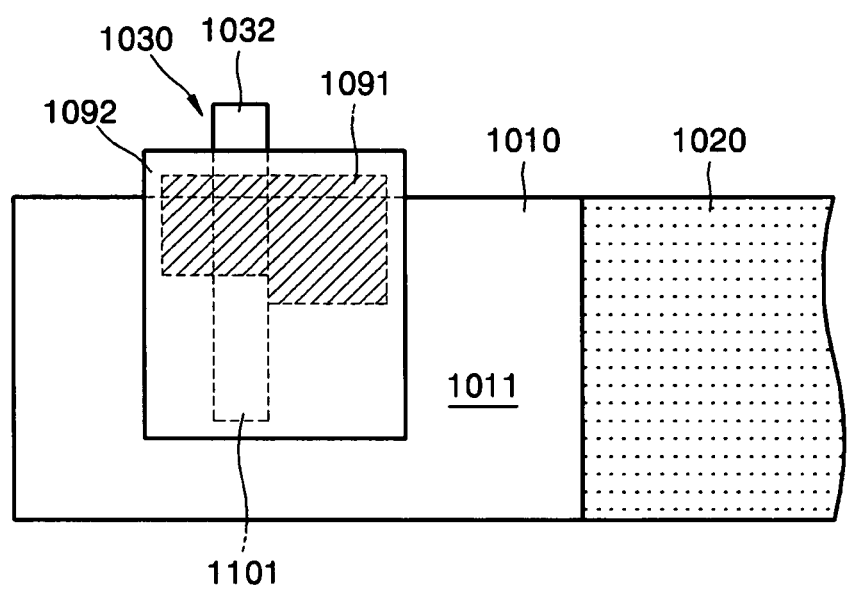
FIG. 11C schematically shows a state in which a second supporting material is used with the electrode current collector shown in FIG. 11B.

As shown in another embodiment of the invention shown in FIG. 11C, a second insulating tape or other supporting material 1092 is used. While not required in all aspects, the insulating tape 1091 (or other supporting material) is adhered to the area 1011 of the first and/or second electrode current collector 1010 where the corresponding electrode active material layer 1020 is not coated and an electrode tab 1030 will be formed. The portion of the electrode current collector having the electrode insulating tape 1091 is cut at a predetermined width. A cut portion of the electrode uncoated area has a size corresponding to the width of an electrode tab 1032 to be formed in a subsequent process. The cut portion is cut widthwise with respect to the electrode current collector 1010 from substantially the center of the electrode uncoated area 1011 until near the upper end of the electrode current collector 1010. Then, the cut portion is folded toward the upper end of the electrode current collector 1010, thereby forming the electrode tab 1030. One end of the electrode tab 1030 is exposed outside the upper end of the electrode current collector 1010. The second insulating tape 1092 is adhered after electrode tab 1032 is formed.

As shown in the example in FIG. 11C, the second insulating tape 1092 is wider than the insulating tape 1091 so as to cover the insulating tape 1091, including a portion of the insulating tape 1091 that extends past an edge of the electrode current collector 1010. The electrode tab 1030 is exposed past the edge of the electrode current collector 1010 and has a portion further extending past and not covered by the tapes 1091, 1092. The second insulating tape 1092 is rectangular in shape, and further covers the formed through hole 1101. However, it is understood that other shapes and configurations are possible.

Figure 12:
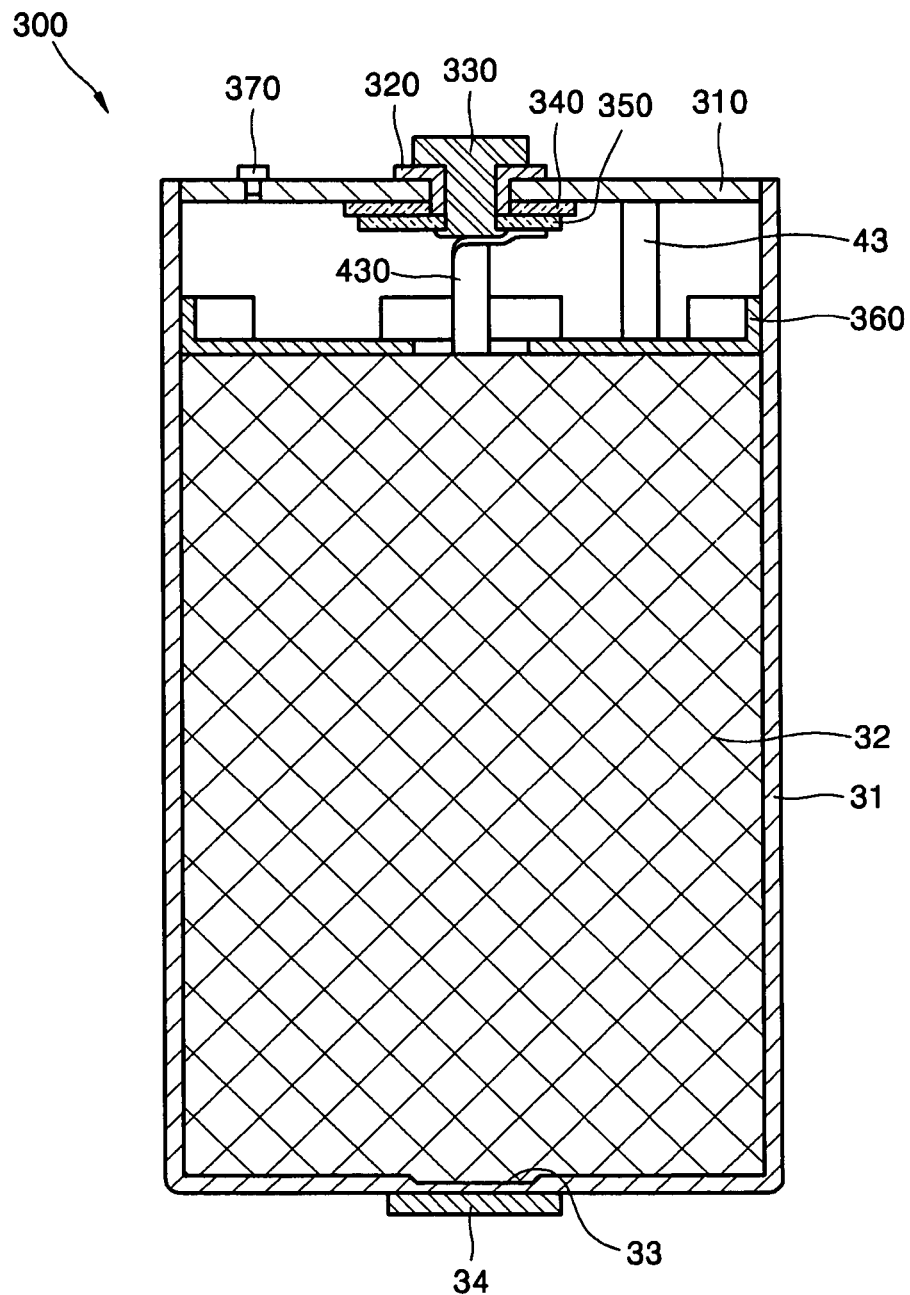
FIG. 12 is a perspective view of a lithium secondary battery according to an embodiment of the present invention showing the welds of the electrode tabs to the terminal and the can.

FIG. 12 shows welds of the electrode tabs 43 and 430 to the terminal 330 and the can 31 according to an aspect of the invention. Since the remaining elements otherwise correspond to those set forth in relation to FIGS. 3-5, a description thereof will not be again provided. As shown, the can 31 is made of a rectangular metal having a cavity holding the battery unit 32. The can 31 itself serves as an electrode terminal and is electrically connected to the positive electrode tab 43 which extends past a case 360 without contacting the plates 340 and 350 to be connected to the can 31, such as through welding to the cap plate 310. As shown, the negative electrode tab 430 is connected, such as by welding, to the negative electrode terminal 330 by extending through the case 360, the plates 340 and 350, the through hole 311, and the gasket 320. The gasket 320 is installed at the outer surface of the negative electrode terminal 330 for insulation from the cap plate 310.

As described above, the jelly-roll type battery unit according to an embodiment of the present invention, the winding method thereof and the lithium secondary battery manufactured using the same have at least the following advantages. Since an electrode tab is formed by cutting a portion of an electrode current collector and folding upward, deformation of a jelly-roll type battery unit is prevented. Also, since a cut portion of an electrode current collector is used in forming an electrode tab, rather than separately providing the electrode tab, a material cost is saved. Moreover, an increase in internal resistance due to use of an electrode tab made of different metals is prevented. Further, since a plurality of insulating tapes are attached to both surfaces of an electrode current collector having an electrode tab incorporated theretinto, electrical short-circuit between electrode plates of opposite polarities is avoided during assembling of a battery. Additionally, since a plurality of insulating tapes are attached to both surfaces of an electrode tab formed by cutting an electrode current collector and folding an end portion of the electrode current collector up, electrical short-circuit due to burring of the electrode tab is prevented. Still further, an electrode tab overlaps with an electrode current collector at the center of a battery unit, thus effectively achieving current collection.

In one embodiment, the jelly-roll type battery unit may be described as comprising: a first tri-functional electrode unit; a second tri-functional electrode unit; and a separator interposed between the first tri-functional electrode unit and the second tri-functional electrode unit, wherein the first tri-functional electrode unit and the second tri-functional electrode unit are wound, with the separator therebetween, to form the battery unit.

While not required, it is understood that embodiments of the invention include lithium secondary batteries including liquid electrolyte batteries, solid electrolyte batteries, and/or polymer electrolyte batteries. Moreover, while described in terms of an insulative tape, it is understood that any supporting material can be used, including supporting materials with insulative materials, materials without insulative materials, and combinations thereof.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A jelly-roll type battery unit comprising:
   a first electrode plate having a first electrode current collector with a first electrode tab, and a first electrode active material layer coated on at least one surface of the first electrode current collector;
   a second electrode plate having a second electrode current collector with a second electrode tab, and a second electrode active material layer coated on at least one surface of the second electrode current collector;
   a separator that is interposed between the first electrode plate and the second electrode plate; and
   a first supporting material disposed on the first electrode current collector, having a cut that extends from an edge to a central portion of the first supporting material, which forms a cut portion that is folded to form a folded portion that faces the first electrode tab and the first electrode current collector, and a non-folded portion that does not face the first electrode tab, wherein,
   the first electrode tab is connected to an uncoated portion of the first electrode current collector, and
   the folded portion comprises overlapping layers of the first supporting material.

2. The jelly-roll type battery unit of claim 1, wherein the first electrode tab is extends past an upper end of the first electrode current collector.

3. The jelly-roll type battery unit of claim 2, wherein:
   the first electrode tab is a cut portion of the first electrode current collector that is folded, so as to face another portion of the first electrode current collector,
   the first supporting material includes an insulating tape, and
   the folded portion is connected to either or both of the first electrode current collector and the first electrode tab.

4. The jelly-roll type battery unit of claim 1, wherein the first electrode tab is disposed at a winding start portion of the first electrode current collector and extends from an innermost layer of the battery unit.

5. The jelly-roll type battery unit of claim 4, wherein the first supporting material includes an insulating tape, and the folded portion is adhered to the first electrode tab and the first electrode current collector.

6. The jelly-roll type battery unit of claim 1, wherein the first electrode tab partially overlaps the second electrode tab.

7. The jelly-roll type battery unit of claim 1, wherein the first electrode tab is folded so as to face the first electrode collector and form an opening in the first electrode current collector.

8. The jelly-roll type battery unit of claim 7, wherein the opening defines a channel extending along an edge of the first electrode current collector.

9. The jelly-roll type battery unit of claim 8, wherein the opening extends along more than half of the width of the first electrode current collector.

10. The jelly-roll type battery unit of claim 8, wherein the opening extends widthwise from substantially the center of the first electrode current collector.

11. The jelly-roll type battery unit of claim 1, further comprising a second supporting material disposed on the first electrode tab and the first electrode current collector, such that the first electrode tab is disposed between the first and second supporting materials.

12. The jelly-roll type battery unit of claim 1, wherein a free end of the first electrode tab is welded to one of an inner portion of a cap assembly of a can of a battery, or an inner portion of the can.

13. A method of forming an electrode tab incorporated into a current collector for use in an electrode of a lithium secondary battery, the method comprising:
- adhering a first supporting material to an outer surface of a non-coated portion of the current collector;
- cutting the current collector and the first supporting material, so as to form a first cut portion in the current collector and a second cut portion the first supporting material; and
- folding the first and second cut portions, such that the first cut portion forms an electrode tab that extends past an edge of the current collector, and the second cut portion forms a folded portion of the first supporting material that is disposed between the electrode tab and the current collector,
- wherein the first supporting material has an unfolded portion that does not face the electrode tab.

14. The method of claim 13, further comprising adhering a second supporting material to the electrode tab, such that the electrode tab is interposed between the first and second supporting materials.

15. The jelly-roll type battery unit of claim 1, further comprising a second supporting material covering the electrode tab, such that the first electrode tab is between the first and second supporting materials.

* * * * *

UNITED STATES PATENT AND TRADEMARK OFFICE
CERTIFICATE OF CORRECTION

PATENT NO.        : 8,734,985 B2
APPLICATION NO.   : 11/304710
DATED             : May 27, 2014
INVENTOR(S)       : Chang-Seob Kim et al.

It is certified that error appears in the above-identified patent and that said Letters Patent is hereby corrected as shown below:

In the Claims

Col. 12, line 25, Claim 2      Delete "tab is extends",

Insert --tab extends--

Col. 13, line 8, Claim 13      Delete "portion the",

Insert --portion in the--

Signed and Sealed this
Fourteenth Day of June, 2016

Michelle K. Lee
*Director of the United States Patent and Trademark Office*